US012668496B2

(12) United States Patent
Maruyama

(10) Patent No.: US 12,668,496 B2
(45) Date of Patent: Jun. 30, 2026

(54) METHODS AND APPARATUSES FOR MAKING NANOMATERIALS IN SPACE

(71) Applicant: Government of the United States, as represented by the Secretary of the Air Force, Wright-Patterson AFB, OH (US)

(72) Inventor: Benji Maruyama, Yellow Springs, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 658 days.

(21) Appl. No.: 18/094,494

(22) Filed: Jan. 9, 2023

(65) Prior Publication Data

US 2023/0234856 A1 Jul. 27, 2023

Related U.S. Application Data

(60) Provisional application No. 63/302,867, filed on Jan. 25, 2022, provisional application No. 63/302,880, filed on Jan. 25, 2022.

(51) Int. Cl.
*C01B 32/162* (2017.01)
*B82Y 40/00* (2011.01)
(Continued)

(52) U.S. Cl.
CPC .......... *C01B 35/146* (2013.01); *C01B 32/162* (2017.08); *C01G 23/047* (2013.01); *H01Q 1/00* (2013.01); *B82Y 40/00* (2013.01)

(58) Field of Classification Search
CPC ... C01B 35/146; C01B 32/162; C01G 23/047; B82Y 40/00
See application file for complete search history.

(56) References Cited

U.S. PATENT DOCUMENTS 8,518,363 B2    8/2013    Noda et al.
9,073,045 B2    7/2015    Noda et al.
(Continued)

FOREIGN PATENT DOCUMENTS

EP        2411328 A1    2/2012
WO        9628577 A1    9/1996

OTHER PUBLICATIONS

Ahmad, et al. "Low temperature growth of carbon nanotubes—A review." Carbon 158 (2020): 24-44 (Year: 2020).*
(Continued)

*Primary Examiner* — Anthony J Zimmer
*Assistant Examiner* — Eric Scott Sherman
(74) *Attorney, Agent, or Firm* — AFMCLO/JAZ; Jeffrey V. Bamber

(57) ABSTRACT

Methods and apparatuses for making nanomaterials are disclosed. The methods involve passing one or more source materials through a high pressure and high temperature chamber with an open throat, and then allowing the reactants to expand into a lower pressure, lower temperature zone. The source material is non-stoichiometric and fuel-rich so that excess un-combusted primary source material can form the nanomaterials. In some cases, the apparatus may be in the form of a modified rocket engine. The methods may be used to make various materials including: carbon nanotubes, boron nitride nanomaterials, titanium dioxide, and any materials that are currently produced by flame synthesis, including but not limited to electrocatalysts. The methods may also be used to make nanomaterials outside the Earth's atmosphere. The methods can include making, coating, or repairing structures in space, such as antennae.

14 Claims, 2 Drawing Sheets

Process Flow Direction

(51) Int. Cl.
    *C01B 35/14*      (2006.01)
    *C01G 23/047*    (2006.01)
    *H01Q 1/00*       (2006.01)

(56)           References Cited

U.S. PATENT DOCUMENTS

| | | | |
|---|---|---|---|
| 2004/0179989 A1 | 9/2004 | Height et al. | |
| 2006/0104887 A1 | 5/2006 | Fujioka et al. | |
| 2006/0216221 A1 | 9/2006 | Lee | |
| 2010/0009165 A1 | 1/2010 | Patel et al. | |
| 2010/0119724 A1 | 5/2010 | Donnet et al. | |
| 2014/0227548 A1 | 8/2014 | Myrick | |
| 2017/0210628 A1 | 7/2017 | Tse et al. | |
| 2021/0310117 A1* | 10/2021 | Karimi | ........... C23C 16/271 |

OTHER PUBLICATIONS

International Bureau of WIPO, International Preliminary Report on Patentability dated Jul. 30, 2024, issued in related PCT Patent Application No. PCT/U2023/010787 filed Jan. 13, 2023; 6 pages.

European Patent Office, International Search Report and Written Opinion dated Jun. 30, 2023, issued in related PCT Patent Application No. PCT/U2023/010787 filed Jan. 13, 2023; 11 pages.

Kim, K.S. et al., "Nanofabrication by Thermal Plasma Jets: From Nanoparticles to Low-Dimensional Nanomaterials", Journal of Applied Physics, American Institute of Physics, 2 Huntington Quadrangle, Melville, NY 11747, vol. 125, No. 7, Feb. 19, 2019; 26 pages.

Kulu, Eric, Carbon Nanotubes, Factories in Space, published on the internet at https://www.factoriesinspace.com/carbon-nanotubes, Last updated: Sep. 5, 2020.

Morrison, Philip W., et al., Synthesis of diamond filaments in an oxyacetylene torch, Appl. Phys. Lett. 60, 565 (1992); Published Online: Jun. 4, 1998 at https://doi.org/10.1063/1.106609.

Liu, Shuo, et al., Fundamentals and Recent Applications of Catalyst Synthesis Using Flame Aerosol Technology, Department of Chemical and Biological Engineering, University at Buffalo, The State University of New York, Buffalo, NY 14260, USA, published on the internet Feb. 1, 2021 at https://par.nsf.gov/servlets/purl/10191378.

Tran-Phu, Trahn, et al., From Stochastic Self-Assembly of Nanoparticles to Nanostructured (Photo) Electrocatalysts for Renewable Power-to-X Applications via Scalable Flame Synthesis, Advanced Functional Materials / vol. 32, Issue 13 / 2110020, published on the internet Dec. 10, 2021 at https://doi-org.wrs.idm.oclc.org/10.1002/adfm.202110020.

Hou, Peng-Xiang, et al., Synthesis of Carbon Nanotubes by Floating Catalyst Chemical Vapor Deposition and Their Applications, Advanced Functional Materials / vol. 32, Issue 13 /2108541, published online Nov. 5, 2021 at https://onlinelibrary-wiley-com.wrs.idm.oclc.org/toc/16163028/2022/32/11.

Scott, C.D., et al., Growth mechanisms for single-wall carbon nanotubes in a laser-ablation process, Applied Physics A Materials Science & Processing, 72, 573-580 (Mar. 23, 2001), published online by Springer-Verlag.

Hall, Nancy, Liquid Rocket Engine, published on the internet at https://www.grc.nasa.gov/www/k-12/airplane/rockth.html by NASA Glenn Research Center, last updated May 13, 2021.

Kolosnjaj-Tabi, Jelena, Anthropogenic Carbon Nanotubes Found in the Airways of Parisian Children, EBioMedicine 2, 1697-1704, published Oct. 9, 2012 by Elsevier B.V. at https://www.sciencedirect.com/science/article/pii/S2352396415301754.

Chen, Tao, Synthesizing carbon nanotubes in space, Astronomy & Astrophysics, vol. 631, Nov. 2019, Published online by EDP Sciences on Oct. 18, 2019 at https://www.aanda.org/articles/aa/pdf/2019/11/aa35789-19.pdf.

Abdalla, S, et al., Different Technical Applications of Carbon Nanotubes, Nanoscale Research Letters, a Springer Open Journal (Sep. 16, 2015) 10:358, Department of Physics, Faculty of Science, King Abdulaziz University Jeddah, P.O. Box 80203, Jeddah 21589, Saudi Arabia, published on the internet at https://nanoscalereslett.springeropen.com/articles/10.1186/s11671-015-1056-3.

Wikipedia, Rolling Coal, published on the internet at https://en.wikipedia.org/wiki/Rolling_coal, last edited Nov. 25, 2022.

Wikipedia, Synthesis of Carbon Nanotubes, published on the internet at https://en.wikipedia.org/wiki/Synthesis_of_carbon_nanotubes, last edited Jun. 30, 2022.

Stach, et al., Autonomous experimentation systems for materials development: A community perspective, Matter (Sep. 1, 2021), published on the internet at https://doi.org/10.1016/j.matt.2021.06.036.

Nikolaev, Pavel, et al., Autonomy in materials research: a case study in carbon nanotube growth, Nature Partner Journals (NPL) Computational Materials, (2016) 2, 16031; doi: 10.1038/npjcompumats.2016.31; published online Oct. 21, 2016.

Takeuchi, Sadao, et al., "Synthesis and evaluation of high-quality homoepitaxial diamond made by the combustion flame method", published by Elservier B.V., Thin Solid Films 377 (Dec. 1, 2000): 290-294.

U.S. Patent and Trademark Office Action in U.S. Appl. No. 18/094,490 dated Mar. 9, 2026.

* cited by examiner

METHODS AND APPARATUSES FOR MAKING NANOMATERIALS IN SPACE

Pursuant to 37 C.F.R. § 1.78(a)(4), this application claims the benefit of and priority to prior filed Provisional Application Ser. Nos. 63/302,867 and 63/302,880, both filed Jan. 25, 2022, which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to methods and apparatuses for making nanomaterials and, more particularly, to methods that involve passing one or more input materials that will comprise reactants through a high pressure and temperature chamber with an open throat, and then allowing the input materials to expand into a lower pressure, lower temperature zone.

BACKGROUND OF THE INVENTION

Current methods of making nanomaterials such as carbon nanotubes include: floating catalyst synthesis, flame synthesis, and laser oven synthesis. However, such current methods are typically limited in the rate of production of carbon nanotubes. In some cases, the methods may only be capable of producing milligrams or grams of nanotubes per hour.

A need, therefore, exists for improved methods of making nanomaterials, including but not limited to carbon nanotubes, boron nitride compounds (including particles and boron nitride nanotubes), and titanium dioxide particles that have improved rates of production.

SUMMARY OF THE INVENTION

The present invention relates generally to methods and apparatuses for making nanomaterials and, more particularly, to methods that involve passing one or more input materials that will comprise reactants through a high pressure and temperature chamber with an open throat, and then allowing the input material(s) to expand into a lower pressure, lower temperature zone.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a method of making nanomaterials is provided comprising:

a) introducing at least two materials into the chamber of an apparatus, wherein when the materials are in the chamber, they are at a first pressure and a first temperature, the first pressure and the first temperature being relatively high, the apparatus having a throat having a reduced size opening, the throat being downstream from the chamber, wherein the apparatus further comprises a reduced pressure and temperature zone downstream from the throat, the zone having an exit, wherein at least one of the materials comprises a primary source material for the nanomaterials to be formed;

b) passing the materials into the throat;

c) passing the materials into the reduced pressure and temperature zone wherein the materials expand at a lower pressure than the first pressure;

d) forming nanomaterials in the apparatus; and e) collecting the nanomaterials at the exit from the zone.

In another embodiment, an apparatus for making nanomaterials is provided. The apparatus may comprise:

a chamber for introducing at least one material and containing the material(s) at a first pressure and a first temperature, wherein the first pressure and the first temperature are relatively high, the apparatus having at least one inlet for the material(s) and a throat having a reduced size opening, the throat being downstream from the chamber;

a reduced pressure and temperature zone downstream from the throat, which is at a lower pressure and lower temperature than the first pressure and first temperature, the zone having an exit; and a nanomaterial collection zone downstream from the reduced pressure and temperature zone.

Numerous applications of the methods and apparatuses described herein are possible. The methods and apparatuses can be used to make many different nanomaterials including, but not limited to carbon nanotubes (CNTs), nanodiamond, carbon black, boron nitride or metal boride nanomaterials, and titanium dioxide. The methods to make any of these materials may be considered inventions in their own right.

The methods described herein can be used in other applications including, but not limited to for directed deposition onto surfaces to form hard coatings. Such coatings may be useful for cutting tools, to provide abrasion layers, or for other purposes.

The methods and apparatuses can also be adapted to synthesize nanomaterials, such as carbon nanotubes, in outer space (i.e., beyond the Earth's atmosphere), including under conditions of zero gravity and low pressure. For example, the methods and apparatuses can be used to make antennas for communication in space.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to methods and apparatuses for making nanomaterials and, more particularly, to methods that involve passing one or more input materials that will comprise reactants through a high pressure and temperature chamber with an open throat, and then allowing the input materials to expand into a lower pressure, lower temperature zone.

The term "nanomaterials", as used herein, refers to output materials such as particles, fibers, and tubes with one or more external dimensions in a size range between 1-100 nanometers. The term "nanomaterials", as used herein, can also include output materials with one or more external dimensions in a size range from 1 nanometer or more, up to about 500 nanometers in size. The nanomaterials can be of any shape. The methods and apparatuses of the present invention are, however, not limited to producing nanomaterials.

In some cases, the methods and apparatuses of the present invention may be used to make output materials or products that are larger than nanomaterials, and in some cases, considerably larger. For example, the methods and apparatuses of the present invention may be used to make bulk diamond, or other non-nanoscale materials. In such cases, the non-nanoscale materials may be in the millimeter and above scale. Such non-nanoscale materials may have one or more external dimensions that range from greater than 500 nanometers (or greater than or equal to 1 millimeter) up to about 12 inches (about 30.5 cm).

Figure 1:
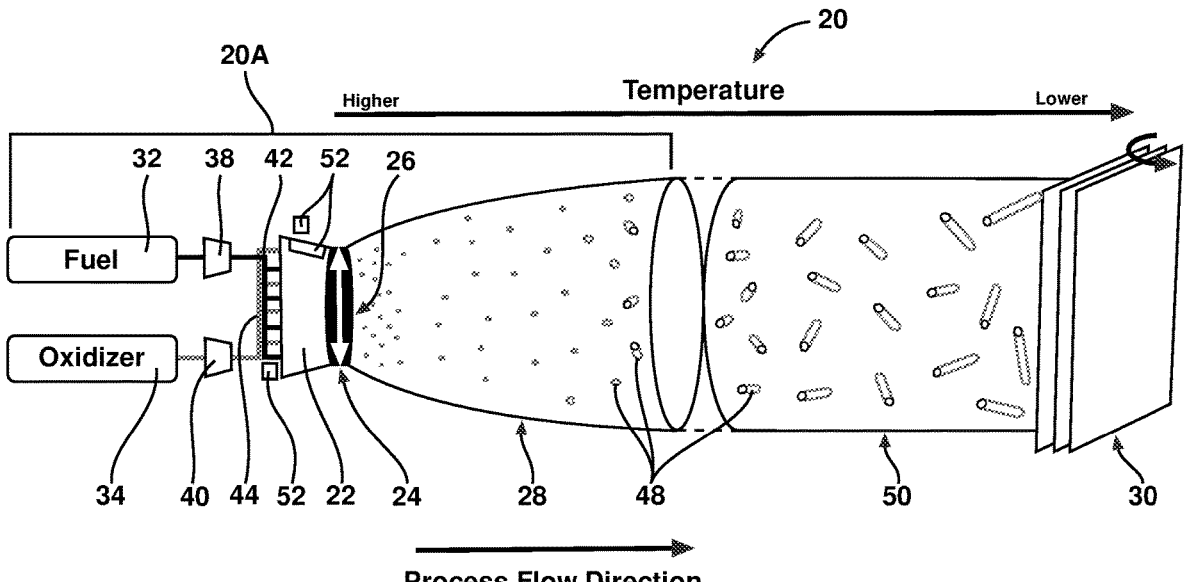
FIG. 1 is a schematic diagram of one embodiment of an apparatus and method for making nanomaterials.

FIG. 1 shows one embodiment of an apparatus 20 and method for making nanomaterials. The apparatus 20 and method can be used to make numerous different types of nanomaterials, depending on what source material(s) are introduced into the apparatus 20. In some cases, the apparatus 20 and method can be used to make carbon materials such as carbon nanotubes (CNT's), nanodiamond, or carbon black. In other cases, the apparatus 20 and method can be used to make boron nitride or metal boride nanomaterials. In other cases, the apparatus 20 and method can be used to make titanium dioxide. In still other cases, the apparatus 20 and method can be used to produce any materials that are currently produced by flame synthesis (or combustion synthesis), including but not limited to catalysts including electrocatalysts. In addition to catalysts, such materials may include, but are not limited to silica, alumina, titania, and magnesia. In still other cases, the apparatus 20 and method can be used to produce any materials that are currently produced by flame spray pyrolysis (or spray pyrolysis). In still other cases, the apparatus 20 and method can be used to produce some materials made by the flash vacuum pyrolysis method.

The apparatus 20 may generally comprise a chamber (or reactor) 22 for introducing or injecting at least one source material into the chamber. The chamber 22 will be under conditions of high pressure and high temperature. The pressure and temperature in the chamber may be referred to as a first pressure and a first temperature. The apparatus 20 has a throat 24 having a reduced size opening 26 that is located downstream of the main part of the chamber. The throat 24 will typically be joined to the chamber 22. The apparatus 20 may further comprise a reduced pressure and temperature zone 28 downstream of the throat 24 in which the reactants can expand at a lower pressure and lower temperature than the first pressure and first temperature. The apparatus 20 may further comprise a nanomaterial collection zone 30 downstream from the reduced pressure and temperature zone 28.

It should be understood that there may be, but does not have to be, a precise demarcation between where one part of the apparatus ends and the downstream part begins. Thus, there can be an overlap between where one portion of the apparatus 20 ends and another portion of the apparatus begins, and the apparatus will still be considered to be within the scope of the invention.

The apparatus 20 can comprise one of various different types of apparatuses. In some cases, as shown in FIG. 1, the apparatus 20 may be inspired by a rocket engine, or a device (or "reactor") similar to a rocket engine 20A. Rocket engines will have a combustion chamber (which operates at high pressure and high temperature) with a throat that restricts the mass flow and contributes to the pressure and temperature increase. The gases in a rocket engine are expanded beyond the throat in a nozzle which reduces the pressure and temperature. The apparatus 20 differs from a rocket engine in several respects, however. Rocket engines are designed to produce thrust, and the method described herein does not require that thrust be produced. Liquid rocket engines are also designed to have a near stoichiometric ratio between fuel and oxidant, so that a minimum of extra, un-combusted gases are introduced. In addition, rocket engines typically do not have a collection zone for collecting materials discharged therefrom. Other types of apparatuses having the components described herein may also be used.

The apparatus 20 is provided with a supply of at least one source material. The source material(s) will include at least a first or primary source material. The term "primary source material", as used herein, refers to a material that will form the material of the nanoparticles. The primary source material can be a carbon, boron, or titanium source material when it is desired to form: carbon nanotubes or carbon black, boron nitride nanomaterials, or titanium dioxide, respectively.

When the apparatus 20 shown in FIG. 1 is being used to make carbon nanotubes, the apparatus 20 is provided with a supply of a first source material 32, and a supply of a second source material 34. In this embodiment, the first source material 32 is a fuel, and the second source material 34 is an oxidizer. The first and second source materials 32 and 34 can be in the form of a liquid or a gas. In some cases, one of the source materials may be a liquid, and the other source material may be a gas. In other cases, both source materials may be liquids, or both may be gases. If the source material(s) are injected in the form of a liquid, they may evaporate or be converted into a gas due to heat when introduced into the chamber 22. The source materials 32 and 34 may be contained in tanks, and may be pumped, or otherwise supplied, through pipes to the combustion chamber 22. In the embodiment shown in FIG. 1, the pipe for each source material has a manifold or injector plate thereon, for distributing the source materials into the combustion chamber 22. The pumps are designated 38 and 40, and the manifolds are designated 42 and 44.

The first source material 32 depends on the type of material that the method is configured to produce. The first source material 32 should comprises a carbon source if the method is intended to produce carbon nanotubes or carbon black. Suitable carbon sources may include, but are not limited to one or more of the following: hydrocarbons (including but not limited to kerosene (e.g., JP8 jet fuel), methane, waste plastic, and coal), alcohol, gasified coal, gasified waste, natural gas, and field gas or unprocessed natural gas. The first source material 32 may also serve as the heat source or combustion source. To produce non-carbon nanomaterials, carbon could be the heat source, although other source materials can be used as the combustion source. For example, hydrogen could be used as a fuel, or in some cases, reduced titanium metal could be used.

If the method is intended to produce boron nitride or metal boride nanomaterials, the first source material 32 should comprises a boron source. For example, boron nitride can be produced by a reaction between borazine or borazylene with ammonia. In this case, ammonia will be the second source material. This reaction between these materials is highly exothermic, so it may not be necessary to provide a separate fuel.

If the method is intended to produce titanium dioxide, the first source material 32 should comprises a source of titanium. Suitable sources of titanium include but are not limited to reduced titanium metal. Titanium's reaction with oxygen is also highly exothermic, so it may not be necessary to provide a separate fuel. In this case, oxygen will be the second source material.

If the method is intended to produce any materials that are currently produced by flame synthesis, including but not limited to catalysts (including electrocatalysts), the first source material 32 may comprise a fuel such as methane, ethane or other hydrocarbons, as well as hydrogen; and the second source material 34 may comprise an oxidizer such as air or oxygen.

The second source material 34 in the embodiment shown in FIG. 1 is an oxidizer. Suitable oxidizers include, but are not limited to one or more of the following: air and oxygen (in liquid or gas form). It should be understood that in some embodiments, such as the alternative embodiments described below that use an outside source of heat instead of combustion, there may not be an oxidizer.

In some cases, other materials can be introduced into the chamber 22, or into other portions of the apparatus 20. These additional materials can be introduced through one of the inlets for the first and second source materials, or through additional inlets similar to the inlets for the first and second source materials. The additional inlets can be any conventional type of inlet. Such other portions of the apparatus 20 may include the throat 24, and the reduced pressure and temperature zone 28. Some of these materials can be supplied in the form of liquids or gases. Other materials, such as water, can be provided either in the form of vapor, or injected in the form of a liquid.

For example, oxidants can be added to improve growth of the nanomaterials. Suitable oxidants include water, $CO_2$, and CO. Promoters can also be added. A promoter is an additive that improves the reaction. It can improve yield, or selectivity. Oxidants can be considered to be a type of promoter. Other promoters include, but are not limited to: ammonia, natural gas, hydrocarbons, alcohol, and sulfur. Sulfur can be provided in the form of $H_2S$, dimethyl sulfoxide (DMSO), and other sulfur-containing gases or liquids.

While the examples of the method that follow are expressed in terms of making carbon nanotubes, it should be understood that other source materials may be substituted as appropriate to produce any of the other nanomaterials described herein.

When making carbon nanotubes, it may be desirable to introduce a catalyst or catalyst precursor into the chamber 22, or into other portions of the apparatus. Suitable catalysts include, but are not limited to transition metals such as iron, nickel, and cobalt. In addition, alloys or compounds of the catalysts can be used including, but not limited to binary, ternary, and more complex compositions. Suitable catalyst precursors include, but are not limited to: ferrocene, iron pentacarbonyl, iron chloride, iron nitrate, iron oxide, and other elements, Ni, Co, and combinations or permutations of all of these. Catalyst supports can also be delivered with the catalysts to help promote growth of the nanomaterials. Suitable catalyst supports include, but are not limited to: silica, alumina, and magnesia.

The catalysts and catalyst supports can also be formed during the heating and/or combustion process from the precursor materials. For example, an iron catalyst can be formed from a precursor molecule such as ferrocene, ferritin, iron chloride salt, etc. Similar precursor compounds exist for other catalyst materials. The catalyst can be supplied by evaporating metal into the gas flow before or inside of the high pressure chamber. For example, iron can evaporate from a solid source at sufficiently high temperature. In the case of making other materials, such as carbon black and titanium dioxide, however, a catalyst may not be needed.

The first and second source materials may be supplied in such proportions that the input materials are non-stoichiometric and fuel-rich. For example, the stoichiometric air-to-fuel ratio of kerosene is 15.6:1 on a mass basis. In the method described herein, the ratio of fuel can be about 1.25 (i.e., 25% higher) up to about 10 times higher than the stoichiometric amount. Thus, for kerosene the ratio of air-to-fuel may be between about 15.6:1.25 and about 15.6:10. This will result in excess un-oxidized carbon (and possibly other gases) that will be the source of carbon for the carbon nanotube or carbon black synthesis. The apparatus 20 may be configured to receive the first and second source materials in a fuel-rich, substantially non-stoichiometric ratio materials by setting appropriate pump flow rates.

The temperature and pressure in the first stage of the process (in the chamber 22) will depend on the input flow rates of the source material (e.g., hydrocarbon, alcohol), oxidant, and any added gases. The temperature and pressure will rise due to the combustion of the fuel with an oxidizer, and the gases will try to escape through the throat. The flow out of the chamber 22 is restricted by the throat 24. The size of the throat opening 26 determines the flow restriction, which, combined with the gas flow rate and combustion, will determine the combustion chamber pressure. In some cases, the combustion chamber pressure may range between about 2 atmospheres and about 60 atmospheres. In some cases, the combustion chamber temperature may range between about 1,000° C. (about 2,000° F.) and about 3,300° C. (about 6,000° F.). The gas temperature in the lower temperature zone 28, such as in the nozzle exit, is less than that in the chamber 22. In some cases, the temperature in the lower temperature zone 28, such as in the nozzle exit may range between about 400° C. (about 750° F.) and about 2,000° C. (about 3,600° F.).

The source material(s) pass through the throat 24 that is located downstream from the inlet(s) for the source material(s). The narrower throat 24 assists in increasing the pressure and temperature in the chamber 22. The gas flow will typically be subsonic in the chamber 22, but may increase to transonic in the throat 24. It is believed that the source material(s) and catalyst or catalyst precursor may become reactants at various locations in the apparatus 20, such when they are in one or more of the following locations: in the chamber 22, in the throat 24, and/or in the reduced pressure and reduced pressure zone 28.

Without wishing to be bound by any particular theory, it is believed that depending on the temperature, the catalyst and carbon may be so energetic as to be single atom or small molecule/dimer entities. As the gases flow through the throat 24 and reduce in temperature and pressure, the catalyst atoms will form small particles, which may range in size between about 1 to about 10 nanometers in diameter. Again, without wishing to be bound by any particular theory, it is believed that the carbon atoms and small molecules (including hydrocarbons) will impinge on the catalyst particles and nucleate carbon nanotubes.

The methods then allow the source materials that comprise the reactants to expand into a zone 28 at a lower pressure and lower temperature than the first pressure and first temperature. This can be thought of as the second stage of the process. In the embodiment shown in FIG. 1, the lower pressure and temperature zone 28 is in the form of a nozzle. As the catalyst and carbon-containing gases flow through the nozzle, carbon nanotubes 48 will nucleate and grow. (The size of the nanoparticles or nanotubes 48 shown in the drawings is greatly exaggerated for illustration.)

The nozzle 28 can serve one or more purposes. The nozzle 28 can expand the flow of the process gases and nanomaterials so as to reduce impingement and agglomeration. The nozzle 28 can reduce the temperature for the synthesis process. The nozzle 28 can reduce the pressure to be compatible with the nanomaterial exhaust and collection process. Depending on the design, the nozzle 28 can be shaped to reduce the speed or flow rate of the nanomaterials. This may ease the collection of the nanomaterials.

The size of the nozzle 28 can be designed to either increase or reduce the residence time of the gases and growing carbon nanotubes in the growth region (nozzle). That is, by having a larger diameter nozzle, or a longer nozzle, the residence time would increase. In some cases, the nozzle 28 may be much larger relative to the throat diameter than the nozzle of a typical rocket engine. For instance, in some cases, the nozzle exit diameter may be between about 20 and about 100, or more, times the throat diameter.

Unlike in rocket engines, where the purpose of the nozzle is to maximize thrust, the nozzle in the methods and apparatuses described herein is used to shape the flow of the gases and particles therein that are exiting the throat. In some cases, it may be desirable for the apparatus 20 described herein to either produce substantially no thrust, or to be anchored so that any thrust produced does not move the apparatus. The nozzle 28 will typically exhaust to atmospheric pressure (i.e., one atmosphere). In cases described below in which the apparatus 20 is used in space, the nozzle 28 may exhaust to less than atmospheric pressure (e.g., a vacuum).

The temperature in the nozzle 28 can be further controlled by secondary heating around the nozzle 28 from external sources (e.g., by a furnace, or by the addition of more fuel, similar to an afterburner or augmenter in a military turbine jet engine). There can also be a secondary throat downstream from the throat 24 to restrict flow and increase pressure and temperature.

After the nozzle 28, where the flow of the materials expands, there can be an optional drift zone 50, which may comprise a tube that maintains the flow of the materials before collection. The drift zone 50 can be separately heated to improve synthesis, or it can be thermally insulated to maintain reaction temperature. If there is a drift zone 50, the nanomaterials 48 may be collected after the drift zone 50.

The methods thus involve collecting the nanoparticles 48 at the exit of the nozzle 28 or drift zone 50. The nanoparticles 48 can be collected using conventional collection or particle separation methods 30. For example, the nanoparticles 48 can be collected using filters (including, but not limited to porous alumina filters) 30 as shown in FIG. 1, or by using spray collection methods (such as with water), or by using centrifuges.

The methods described herein are believed to produce nanomaterials at improved rates and efficiencies of production. It is believed that improved rates and efficiencies of production are the result of splitting the process into two zones: the high pressure and high temperature zone (inside the chamber 22), followed by the lower pressure and lower temperature zone 28 (such as in the nozzle). Without wishing to be bound by any particular theory, it is believed that the high pressure and high temperature zone 22 may completely, or substantially completely, pyrolyze the catalyst and carbon precursors (in the case of making carbon nanotubes), making them accessible for further reaction. As the catalyst and carbon atoms and molecules pass through the throat 24 and into the nozzle 28, they expand and cool quickly. The rapid expansion greatly narrows the window of time over which the catalyst atoms and clusters can agglomerate to form critical size catalysts. This is in contrast to most reactors that have conditions such that the catalysts grow too large to grow carbon nanotubes with the desired properties. The present method embodies a unique process that is believed to be capable of precisely narrowing the condition for optimal catalyst formation in time, through the rapid processing speed, by the focusing and expansion effect of the throat and the nozzle.

In the case of carbon nanomaterials, it is believed that the pyrolysis will fully decompose the carbon precursor molecules into those that are ideal for CNT synthesis. As the carbon atoms and small molecules pass through the throat, they can react with the catalyst particles to nucleate carbon nanotubes. Because the gases are rapidly expanding (reducing in pressure) and cooling, it is believed that an advantage of the current method is that the reactor can support a high concentration of carbon while avoiding unwanted reactor processes like overcoating of the catalyst with carbon, which renders them inactive, and the formation of unwanted carbon forms like soot.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

In some embodiments, instead of using combustion as a source of heat, the heat can be provided by a heat source 52, such as an internal or an external source. The heat source 52 could comprise one or more of the following: heating the gas precursors, or heating the chamber, such as by heating the chamber with an inductive coil. In such cases, when the body material of the high pressure chamber is made of a suitable material (e.g., metal or carbon), the body material of the high pressure chamber could potentially contribute as a catalyst. In such embodiments, there may not be a second source material.

In some cases, the combustion chamber 22 may become too hot. In such cases, any of the techniques used to keep the combustion chambers of rocket engines from overheating can be used in the apparatuses 20 described herein. Such techniques include, but are not limited to applying a film to the inner walls of the combustion chamber 22.

In other embodiments, there need not be a nozzle, and the lower pressure and lower temperature zone 28 may be provided by simply discharging the materials from the throat 24 into the atmosphere.

The properties of the nanomaterials 48 produced by the method can also be modified in various ways. For example, supplemental carbon can optionally be added at or after the reactor throat 24 to extend growth of carbon nanotubes. The diameter and chirality (e.g., twist in the crystalline structure) of the nanotubes 48 can also be controlled by tuning various parameters. It is believed that it may be possible to make one or more of the following types of carbon nanomaterials: graphene, diamond, diamond-like carbon, carbine, and Lonsdaleite (hexagonal diamond).

It is believed that, in addition to making diamond nanomaterials, it may also be possible to make bulk diamond (e.g., films, wafers, bulk crystals, etc.). To make bulk diamond, no catalyst is needed. Several of the steps of the method of making bulk diamond may be similar to, or the same as, those of the method of making nanomaterials. The apparatus can be the same. The method of making bulk diamond comprises a step a) of introducing at least one material, but typically at least two materials into the chamber of the apparatus, wherein at least one of the materials comprises a carbon source material for the bulk diamond to be formed. The other material may be an oxidizer, especially when heat is generated through combustion. At least one of the materials may comprise hydrogen, and in particular atomic hydrogen (as opposed to molecular hydrogen, $H_2$). Steps b) passing the materials into the throat and c) passing said materials into the reduced pressure and temperature zone wherein the materials expand at a lower pressure than the first pressure of the method may be the same. Step d) will comprise forming bulk diamond in the apparatus. Step e) will comprise collecting the bulk diamond at the exit from the zone. An advantage of the invention is the ability to provide large flow rates of atomic hydrogen at high partial pressure. This provides advantages compared to microwave diamond CVD, which is at partial vacuum, and flame synthesis, which has lower flow rates than the method of the current invention.

The method described herein is distinguishable from flame synthesis in that flame synthesis does not have a combustion chamber that comprises a zone of higher temperature and higher pressure. Flame synthesis also does not have a throat or nozzle that materials which will form reactants pass through after the combustion. In flame synthesis, the synthesis happens inside the chamber or immediately beyond the flame, which is at atmospheric pressure.

If desired, in situ and in line diagnostics can be employed at the different stages along the process, and used to analyze the growth process, as well as be used as information to dynamically control and improve the process, such as via closed-loop autonomous methods such as the Automated Research System (ARES) described in Nikolaev, et al. "Autonomy in Materials Research: A Case Study in Carbon Nanotube Growth", Nature Partner Journals npj Computational Materials, published online Oct. 21, 2016 at https://www.nature.com/articles/npjcompumats201631/.

The methods described herein provide increased flexibility in that they can use a variety of source materials. The methods can be used to form carbon nanotubes from natural gas. The methods can be used to form carbon nanotubes from field natural gas, sometimes referred to as stranded natural gas, or flare gas. These sources of carbon precursor can be exploited by the current methods, and can take advantage of the reduced costs associated with the lower value source materials. The methods can use un-processed or minimally-processed natural gas that still contains components including liquids, water, carbon dioxide, and sulfur. Thus, the methods described herein are believed to be capable of synthesizing CNTs despite the natural gas impurities and can accommodate source-by-source and temporal variations in the composition of the natural gas source.

The methods described herein can be used in other applications including, but not limited to for directed deposition onto surfaces for coatings. The surface coatings can comprise any of the materials described herein that can provide a surface with the desired properties of hardness, abrasiveness, etc. Such coatings may be useful for cutting tools, to provide abrasion layers, or for other purposes. In such cases, there need only be a single article in the nanomaterial collection zone 30, instead of the three stacked porous alumina filters shown in FIG. 1. Of course, a plurality of articles can be placed side-by-side in an orientation that may be generally perpendicular to the longitudinal axis of the apparatus, rather than stacked, if it desired to coat several articles simultaneously.

The hard surface coatings described herein may include nanodiamonds, and diamond films. In making these materials, the process should be carried out so that atomic hydrogen from the exhaust of the apparatus impinges on the article or substrate, along with the carbon. In some cases, the substrate may comprise a growing diamond.

The methods and apparatuses can also be adapted to synthesize nanomaterials in outer space (i.e., beyond the Earth's atmosphere), including under conditions of zero gravity and low pressure. The methods and apparatuses can be used in outer space to synthesize any of the types of materials described herein that they can be used to make on Earth. Since rocket engines can be used in space, it is believed that the present methods and apparatuses are well adapted to conditions in space. Thus, the methods and apparatuses are believed to be capable of performing their functions in orbit, in deep space, or on other planets. In some cases, such as when the apparatus 20 is used in space, it may be desirable for the apparatus to produce thrust so that the apparatus is capable of movement.

There are numerous potential applications for synthesizing nanomaterials, such as carbon nanotubes, in outer space. In some cases, the nanomaterials, such as carbon nanotubes, can be used for typical carbon nanotube applications in space.

Figure 2:
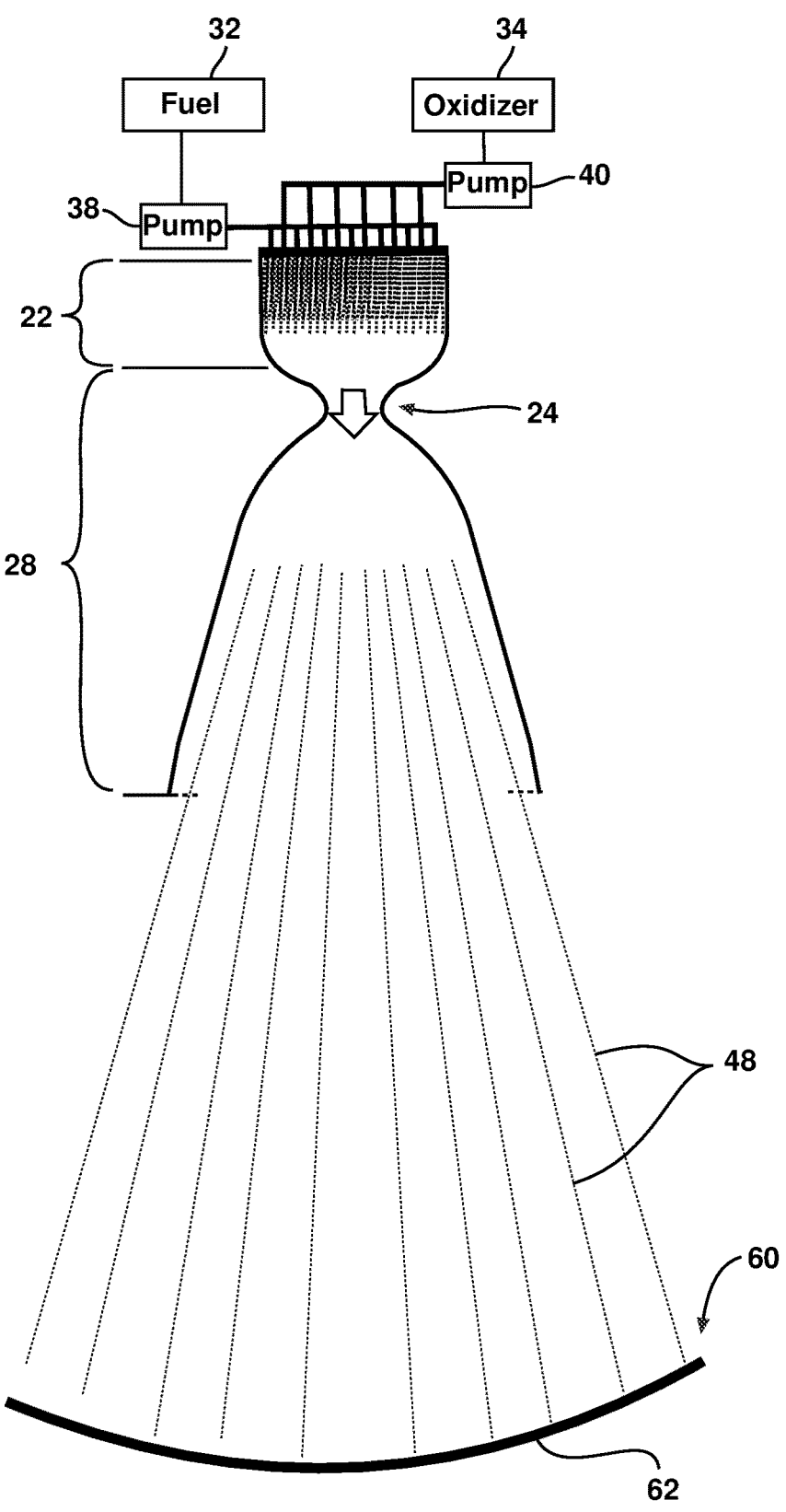
FIG. 2 is a schematic diagram of one embodiment of an apparatus and method for making nanomaterials in space.

In other cases, as shown in FIG. 2, the carbon nanotubes 48 can be used to make antennae 60 for communication in space. This can be accomplished by directing the CNT rocket nozzle 28 exhaust to an existing frame 62 that will serve as a substrate or framework or mesh that can catch the CNTs 48. The frame 62 may be in the form of a relatively coarse mesh. The CNTs can then be directed like a spray across the surface of the frame 62 of the antenna 60 (which could be very large), until the desired degree of coverage is accomplished. The CNTs may form a finer mesh coating, or solid coating, over the frame 62. The CNTs 48 may likely deposit as a low density, cotton ball-like "fluff". To improve the figure or flatness of the antenna surface, the CNT deposit could be condensed by spraying it with a liquid (e.g., water, alcohol, acetone) that would collapse the deposit through the very strong capillary forces that would shrink the deposit as the liquid evaporates.

In addition to radar and other RF antenna applications, the nanotube RF reflecting surfaces could be used for focused energy transmission to the ground or other space receivers.

Another application of the methods in space is to manufacture a solar sail in space for space propulsion.

In addition, in situ and/or in orbit repair can also be provided by the present methods. For example, holes or defects created by space debris can be repaired, and the RF reflective properties can be modified in situ. In such cases, for the purposes of illustration, the frame 62 in FIG. 2 can, alternatively, be considered to represent and article in space that is in need of repair.

The methods and apparatuses described herein can provide a number of advantages. These advantages are described below, as well as throughout this description. It should be understood, however, that these advantages need not be required unless they are set forth in the appended claims.

The main advantage of the methods and apparatuses described herein is the improved production rates that are believed to be possible. Typical current carbon nanotube processes are limited in flow rate to producing milligrams or grams of nanotubes per hour. It is believed that the methods and apparatuses described herein may be able to produce carbon nanotubes at rates of kilograms per day, up to tons per day.

Another advantage in making carbon nanotubes is that because the carbon precursor is a hydrocarbon, it can use the same fuel source as conventional liquid-fueled rockets (e.g., kerosene).

The methods described herein are also believed to be potentially capable of producing nanoparticles less expensively than current methods, for several reasons. By using combustion for the heat source, the need for external heating is obviated, leading to decreased energy costs. In addition, it is believed that because the growth of the nanoparticles will be more efficient in terms of both catalyst usage efficiency (i.e., the quantity of carbon nanotubes per mass of catalyst), and carbon usage efficiency (i.e., the quantity of carbon nanotubes per mass input of carbon precursor). Further, by producing the nanoparticles faster, there should be reduced labor costs and capital equipment costs.

Numerous advantages are possible when the methods are used to produce nanomaterials in space. As discussed above, in one application, the method can be used to construct antennae for communication in space. Satellite antennas are limited by weight and size constraints, along with robustness required to survive launch and deployment that is not needed on orbit. It is, therefore, desirable to produce on-orbit synthesized CNT antenna that are lighter, more robust, and better performing than state of the art antennae. By avoiding launch and deployment loads, it is believed that a thinner, lower mass RF reflective surface that exploits the exceptional mechanical and RF CNT properties can be produced. The lower mass reduces payload as well as increases slew rate. It is believed that the methods described herein will also provide the ability to repair holes or tears in the antenna while on orbit.

The term "joined", as used herein, encompasses configurations in which an element is directly secured to another element by affixing the element directly to the other element;

configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of making nanomaterials in outer space, said method comprising:
   a) introducing at least two materials through pipes into a chamber of an apparatus that is located beyond the Earth's atmosphere, wherein the chamber has a width that is greater than the width of the pipes, wherein when the materials are in said chamber, they are at a first pressure and a first temperature, said apparatus having a throat having a reduced size opening, said throat being downstream from said chamber, wherein said apparatus further comprises a reduced pressure and temperature zone downstream from said throat, said zone having an exit, wherein at least one of said materials comprises a primary source material for the nanomaterials to be formed;
   b) passing said materials into said throat;
   c) passing said materials into said reduced pressure and temperature zone, wherein the temperature in said reduced temperature zone is less than said first temperature, and wherein said materials expand at a lower pressure than said first pressure;
   d) forming nanomaterials in said apparatus; and
   e) collecting said nanomaterials at the exit from said zone.

2. A method of making nanomaterials in outer space, said method comprising:
   a) introducing at least two materials into a combustion chamber of an apparatus that is located beyond the Earth's atmosphere, wherein when the materials are in said combustion chamber, they are at a first pressure and a first temperature, said apparatus having a throat having a reduced size opening, said throat being downstream from said combustion chamber, wherein said apparatus further comprises a reduced pressure and temperature zone downstream from said throat, said zone having an exit, wherein at least one of said materials comprises a primary source material for the nanomaterials to be formed;

b) passing said materials into said throat;

c) passing said materials into said reduced pressure and temperature zone, wherein the temperature in said reduced temperature zone is less than said first temperature, and wherein said materials expand at a lower pressure than said first pressure;

d) forming nanomaterials in said apparatus; and e) collecting said nanomaterials at the exit from said zone.

3. The method of claim 2 wherein the combustion chamber and said reduced pressure and temperature zone are provided in the form of a rocket engine comprising a nozzle, wherein said reduced pressure and temperature zone is inside said nozzle.

4. The method of claim 2 wherein at least one of said materials comprises a fuel and at least one of said materials comprises an oxidizer.

5. The method of claim 4 wherein said primary source material comprises a carbon source, and said nanomaterials comprise carbon nanotubes.

6. The method of claim 5 wherein the carbon source comprises a carbon-containing fuel, wherein the ratio of fuel and oxidizer is non-stoichiometric and fuel-rich so that when combusted, excess un-combusted carbon is created that will provide the primary source material for the nanomaterials.

7. The method of claim 6 further comprising a step of introducing a catalyst or catalyst precursor into the combustion chamber prior to step (b), and said carbon source and catalyst or catalyst precursor participate in a reaction.

8. The method of claim 7 wherein the catalyst or catalyst precursor comprises a metal or an alloy of two or more metals.

9. A method of making nanomaterials in outer space, said method comprising:

a) introducing at least two materials into a chamber of an apparatus that is located beyond the Earth's atmosphere, wherein when the materials are in said chamber, they are at a first pressure and a first temperature, said apparatus having a throat having a reduced size opening, said throat being downstream from said chamber, wherein said apparatus further comprises a reduced pressure and temperature zone downstream from said throat, said zone having an exit, wherein at least one of said materials comprises a boron source material for the nanomaterials to be formed;

b) passing said materials into said throat;

c) passing said materials into said reduced pressure and temperature zone, wherein the temperature in said reduced temperature zone is less than said first temperature, and wherein said materials expand at a lower pressure than said first pressure;

d) forming nanomaterials in said apparatus, wherein said nanomaterials comprise boron nitride compounds; and e) collecting said nanomaterials at the exit from said zone.

10. The method of claim 2 wherein said primary source material comprises a source of titanium, and said nanomaterials comprise titanium dioxide nanoparticles.

11. The method of claim 4 wherein the fuel comprises a hydrocarbon, the oxidizer comprises one or more of the following: air or oxygen, and said nanomaterials formed comprise at least one of catalysts and electrocatalysts.

12. A method according to claim 2 for making an antenna in space, wherein the step (e) of collecting said nanomaterials at the exit from said zone comprises: providing a frame for an antenna, directing the nanomaterials exiting from the zone onto said frame, and forming an antenna on said frame wherein the surface of said antenna at least partially comprises said nanomaterials.

13. The method of claim 12 wherein said primary source material comprises a carbon source, and said nanomaterials comprise carbon nanotubes.

14. A method according to claim 2 for repairing a structure in space, wherein the step (e) of collecting said nanomaterials at the exit from said zone comprises directing the nanomaterials exiting from the zone onto said structure to repair said structure.

* * * * *